United States Patent
Li et al.

(10) Patent No.: US 8,645,313 B1
(45) Date of Patent: Feb. 4, 2014

(54) SYSTEMS AND METHODS FOR ENHANCED SQL INDICES FOR DUPLICATE ROW ENTRIES

(75) Inventors: Benjamin Li, McLean, VA (US); Xinyi Wang, Herndon, VA (US); Xiaonan Han, Fairfax, VA (US); Daniel Kerzner, Arlington, VA (US); Hanijanto Soewandi, Germantown, MD (US)

(73) Assignee: Microstrategy, Inc., McLean, VA (US)

( * ) Notice: Subject to any disclaimer, the term of this patent is extended or adjusted under 35 U.S.C. 154(b) by 1062 days.

(21) Appl. No.: 11/139,017

(22) Filed: May 27, 2005

(51) Int. Cl.
 *G06F 17/00* (2006.01)
 *G06F 7/00* (2006.01)

(52) U.S. Cl.
 USPC ............... 707/600; 707/602; 706/46; 706/47

(58) Field of Classification Search
 USPC ...................................... 707/1–100
 See application file for complete search history.

(56) References Cited

U.S. PATENT DOCUMENTS

| | | | |
|---|---|---|---|
| 4,688,195 A | 8/1987 | Thompson | |
| 4,829,423 A | 5/1989 | Tennant | |
| 4,876,643 A | 10/1989 | McNeill | |
| 5,197,005 A * | 3/1993 | Shwartz et al. | 707/2 |
| 5,276,870 A | 1/1994 | Shan | |
| 5,418,943 A | 5/1995 | Borgida | |
| 5,421,008 A | 5/1995 | Banning | |
| 5,555,403 A | 9/1996 | Cambot | |
| 5,584,024 A | 12/1996 | Shwartz | |
| 5,664,182 A | 9/1997 | Nirenberg | |
| 5,692,181 A | 11/1997 | Anand | |
| 5,864,856 A | 1/1999 | Young | |
| 5,884,307 A * | 3/1999 | Depledge et al. | 707/7 |
| 5,914,878 A | 6/1999 | Yamamoto | |
| 5,938,732 A | 8/1999 | Lim et al. | |
| 5,960,194 A * | 9/1999 | Choy et al. | 1/1 |
| 6,078,960 A | 6/2000 | Ballard | |
| 6,128,642 A | 10/2000 | Doraswamy et al. | |
| 6,154,766 A | 11/2000 | Yost | |
| 6,161,105 A * | 12/2000 | Keighan et al. | 707/100 |
| 6,169,983 B1 * | 1/2001 | Chaudhuri et al. | 1/1 |
| 6,189,010 B1 * | 2/2001 | Isip, Jr. | 1/1 |
| 6,247,008 B1 | 6/2001 | Cambot | |
| 6,279,033 B1 | 8/2001 | Selvarajan | |
| 6,304,876 B1 * | 10/2001 | Isip, Jr. | 707/100 |
| 6,353,820 B1 * | 3/2002 | Edwards et al. | 707/696 |
| 6,374,256 B1 * | 4/2002 | Ng et al. | 707/741 |

(Continued)

OTHER PUBLICATIONS

Robert C. Stern, Bruce M. Anderson and Craig W. Thompson, A Menu-Based Natural Language Interface to a Large Database, Texas Instruments Incorporated, P. O. Box 660246, MS 238, Dallas, Texas 75266, NAECON: National Aerospace & Electronics Conference, Dayton, Ohio, May 20-24, 1985.

(Continued)

*Primary Examiner* — Angelica Ruiz
(74) *Attorney, Agent, or Firm* — Hunton & Williams LLP

(57) ABSTRACT

A system and method for indexing non-uniquely indexed entries in a report generated with a business intelligence system, such as, for example, an on-line analytical processing (OLAP) system. A dummy index is added to each index element returned in the report. Non-unique index elements receive different dummy indices to distinguish otherwise identical row elements. The dummy index is added to a base template and optionally also to a view template of a report generator of the OLAP system.

19 Claims, 5 Drawing Sheets

(56) References Cited

U.S. PATENT DOCUMENTS

| | | | |
|---|---|---|---|
| 6,457,006 B1* | 9/2002 | Gruenwald | 707/7 |
| 6,460,048 B1* | 10/2002 | Teng et al. | 1/1 |
| 6,519,597 B1* | 2/2003 | Cheng et al. | 1/1 |
| 6,584,459 B1* | 6/2003 | Chang et al. | 707/812 |
| 6,601,101 B1 | 7/2003 | Lee et al. | |
| 6,606,618 B2* | 8/2003 | Delo | 1/1 |
| 6,609,123 B1* | 8/2003 | Cazemier et al. | 707/4 |
| 6,651,073 B1* | 11/2003 | Lyle et al. | 707/202 |
| 6,675,199 B1 | 1/2004 | Mohammed et al. | |
| 6,691,140 B1* | 2/2004 | Bogrett | 1/1 |
| 6,750,864 B1* | 6/2004 | Anwar | 345/440 |
| 6,778,996 B2* | 8/2004 | Roccaforte | 707/600 |
| 6,839,823 B1* | 1/2005 | See et al. | 711/171 |
| 6,920,458 B1* | 7/2005 | Chu et al. | 707/600 |
| 7,093,194 B2* | 8/2006 | Nelson | 715/234 |
| 7,197,471 B2* | 3/2007 | Cary et al. | 705/10 |
| 2002/0019873 A1 | 2/2002 | Goldszmidt et al. | |
| 2002/0040400 A1 | 4/2002 | Masters | |
| 2002/0059195 A1* | 5/2002 | Cras et al. | 707/3 |
| 2002/0078209 A1 | 6/2002 | Peng | |
| 2002/0099829 A1 | 7/2002 | Richards et al. | |
| 2002/0186296 A1* | 12/2002 | Gogoi et al. | 348/39 |
| 2003/0014526 A1 | 1/2003 | Pullara et al. | |
| 2003/0023669 A1 | 1/2003 | DeLima et al. | |
| 2003/0037051 A1* | 2/2003 | Gruenwald | 707/7 |
| 2003/0039381 A1* | 2/2003 | Ziesig | 382/124 |
| 2003/0046138 A1* | 3/2003 | Cary et al. | 705/10 |
| 2003/0093408 A1* | 5/2003 | Brown et al. | 707/2 |
| 2003/0195898 A1* | 10/2003 | Agarwal et al. | 707/103 R |
| 2003/0217033 A1* | 11/2003 | Sandler et al. | 707/1 |
| 2004/0088199 A1* | 5/2004 | Childress et al. | 705/4 |
| 2004/0148278 A1* | 7/2004 | Milo et al. | 707/3 |
| 2004/0153435 A1* | 8/2004 | Gudbjartsson et al. | 707/1 |
| 2004/0215626 A1* | 10/2004 | Colossi et al. | 707/100 |
| 2004/0220972 A1* | 11/2004 | Bhattacharjee et al. | 707/200 |
| 2005/0021516 A1* | 1/2005 | Potter et al. | 707/4 |
| 2005/0044102 A1* | 2/2005 | Gupta et al. | 707/102 |
| 2005/0050030 A1* | 3/2005 | Gudbjartsson et al. | 707/3 |
| 2005/0234886 A1* | 10/2005 | Mohraz et al. | 707/3 |
| 2005/0278346 A1* | 12/2005 | Shang et al. | 707/100 |
| 2006/0161403 A1* | 7/2006 | Jiang et al. | 703/2 |
| 2006/0224617 A1* | 10/2006 | Inmon | 707/102 |
| 2007/0128899 A1* | 6/2007 | Mayer | 439/152 |

OTHER PUBLICATIONS

Harry R. Tennant, Kenneth M. Ross, Richard M. Saenz, Craig W. Thompson, and James R. Miller, Computer Science Laboratory, Central Research Laboratories, Texas Instruments Incorporated, Dallas, Texas, 21st Annual Meeting of the Association for Computational Linguistics, MIT, Jun. 1983, pp. 151-158.

Harry R. Tennant, Member, IEEE, Roger R. Bate, Member, IEEE, Stephen M. Corey, Lawrence Davis, Paul Kline, LaMott G. Oren, Malipatola Rajinikanth, Richard Saenz, Daniel Stenger, Member, IEEE, and Craig W. Thompson, Software Innovations for the Texas Instruments Explorer Computer, Proceedings of the IEEE, vol. 73, No. 12, Dec. 1985.

Craig W. Thompson, Kenneth M. Ross, Harry R. Tennant and Richard M. Saenz, Building Usable Menu-Based Natural Language Interfaces to Databases, Proceedings of the Ninth International Conference on Very Large Data Bases, Florence, Italy, Oct. 31-Nov. 2, 1983, pp. 43-55.

Craig W. Thompson, John Kolts, and Kenneth W. Ross, A Toolkit for Building "Menu-Based Natural Language" Interfaces, Texas Instruments Incorporated, P. O. Box 226015, MS 238, Dallas, Texas 75265, 1985.

Craig Warren Thompson, M.A., B.A., Using Menu-Based Natural Language Understanding to Avoid Problems Associated with Traditional Natural Language Interfaces to Databases, Dissertation Presented to the Faculty of the Graduate School of the University of Texas at Austin, May 1984.

GIS/LIS '88 Proceedings accessing the world, vol. 2 pp. 741-750.

Business Objects User's Guide Version 5.1.

Getting Started with Business Objects Version 5.1.

Business Objections Supervisor's Guide Version 5.1.

Quick Start MicroStrategy Agent Version 6.0.

User Guide MicroStrategy Agent Version 6.0.

User Guide MicroStrategy Architect Version 6.0.

User Guide MicroStrategy Objects Version 6.0.

Excel Add-In MicroStrategy Objects Version 6.0.

User Guide MicroStrategy Intelligence Server Version 6.0.

User Guide MicroStrategy Administrator Version 6.0.

Administrator Guide MicroStrategy Administrator Version 6.5.

P. Srisuresh, D. Gan, Load Sharing using IP Network Address Translation, Juniper Networks, Inc., Aug. 1998, p. 1-18.

Alan Robertson, Linux—HA Heartbeat System Design, Proceedings of the 4th Annual Linux Showcase & Conferences, Atlanta, Oct. 10-14, 2000, 12 pages.

Trevor Schroeder, Steve Goddard, Byrav Ramamurthy, Scalable Web Server Clustering Technologies, May/Jun. 2000, University of Nebraska-Lincoln, p. 38-45.

Eric Levy-Abegnoli, Arun Iyengar, Junehwa Soong, Daniel Dias, Design and Performance of a Web Server Accelerator, T.J. Watson Research Center, Yorktown Heights, NY, Jun. 1999, 9 pages.

Nozer D. Singpurwalla, Determining an Optimal Time Interval for Testing and Debugging Software, IEEE Transactions on Software Engineering, vol. 17, No. 4, Apr. 1991, p. 313-319.

Carmen Trammell, Quantifying the Reliability of Software: Statistical Testing Based on a Usage Model, Proceedings of the 2nd IEEE Software Engineering Standards Symposium, 1995, Department of Computer Science, University of Tennessee, Knoxville, TN, p. 208-218.

Andrew S. Tanenbaum, Distributed Operating Systems, Prentice Hall, Upper Saddle River, New Jersey, p. 245-375.

Business Objects Deployment Guide.

Advanced Topics MicroStrategy Agent Version 6.0.

Business Objects Designer's Guide Version 5.1.

Business Objects Error Message Guide Version 5.1.

Business Objects Generic ODBC Access Guide Version 5.1.

Business Objects Info View User's Guide.

Business Objects Installation and Update Guide.

Business Objects MS Access Database Guide Version 5.1.

Business Objects MS SQL Server Database Guide Version 5.1.

* cited by examiner

| Country | Year | Metric1 |
|---|---|---|
| USA (0) | 1996 (0) | 10 |
| USA (0) | 1996 (0) | 20 |
| USA (0) | 1997 (1) | 30 |
| Web (1) | 1996 (0) | 40 |
| Web (1) | 1996 (0) | 50 |

| Country | Year | Dummy | Metric1 |
|---|---|---|---|
| USA (0) | 1996 (0) | (0) | 10 |
| USA (0) | 1996 (0) | (1) | 20 |
| USA (0) | 1997 (1) | (0) | 30 |
| Web (1) | 1996 (0) | (0) | 40 |
| Web (1) | 1996 (0) | (1) | 50 |

| Country | Dummy | Year<br>Metric | 1996<br>1 | 1997<br>1 |
|---|---|---|---|---|
| USA (0) | (0) | | 10 | 30 |
| USA (0) | (1) | | 20 | null |
| Web (1) | (0) | | 40 | null |
| Web (1) | (1) | | 50 | null |

| Year | Dummy | Country Metric | USA 1 | Web 1 |
|---|---|---|---|---|
| 1996 (0) | (0) | | 10 | 40 |
| 1996 (0) | (1) | | 20 | 50 |
| 1997 (1) | (0) | | 30 | null |

| Dummy | Year Country Metric | 1996 USA 1 | 1996 Web 1 | 1997 USA 1 | 1997 Web 1 |
|---|---|---|---|---|---|
| (0) | | 10 | 40 | 30 | null |
| (1) | | 20 | 50 | null | null |

| Country | Dummy | Year Metric | 1996 1 | 1997 1 | Total 1 |
|---|---|---|---|---|---|
| USA (0) | (0) | | 10 | 30 | 40 |
| USA (0) | (1) | | 20 | null | 20 |
| Web (1) | (0) | | 40 | null | 40 |
| Web (1) | (1) | | 50 | null | 50 |
| | | | 120 | 30 | 150 |

| Year | Dummy | Country Metric | USA 1 | Web 1 | Total 1 |
|---|---|---|---|---|---|
| 1996 (0) | (0) | | 10 | 40 | 50 |
| 1996 (0) | (1) | | 20 | 50 | 70 |
| 1997 (1) | (0) | | 30 | null | 30 |
| | | | 60 | 90 | 150 |

| Dummy | Year Country Metric | 1996 USA 1 | 1996 Web 1 | 1996 Total 1 | 1997 USA 1 | 1997 Web 1 | 1997 Total 1 | Total Total 1 |
|---|---|---|---|---|---|---|---|---|
| (0) | | 10 | 40 | 50 | 30 | null | 30 | 80 |
| (1) | | 20 | 50 | 70 | null | null | 0 | 70 |
| | | 30 | 90 | 120 | 30 | 0 | 30 | 150 |

| Country | Year | Dummy | Metric1 |
|---|---|---|---|
| USA (0) | 1996 (0) | (0) | 10 |
| USA (0) | 1996 (0) | (1) | 20 |
| USA (0) | 1997 (1) | (0) | 30 |
| USA | Total | Total | 60 |
| Web (1) | 1996 (0) | (0) | 40 |
| Web (1) | 1996 (0) | (1) | 50 |
| Web | Total | Total | 90 |
| Total | Total | Total | 150 |

| Year | Country | Dummy | Metric1 |
|---|---|---|---|
| 1996 (0) | USA (0) | (0) | 10 |
| 1996 (0) | USA (0) | (1) | 20 |
| 1996 (0) | Web (1) | (0) | 40 |
| 1996 (0) | Web (1) | (1) | 50 |
| 1996 | Total | Total | 120 |
| 1997 (1) | USA (0) | (0) | 30 |
| 1997 | Total | Total | 30 |
| Total | Total | Total | 150 |

| Year | Metric1 |
|---|---|
| 1996 (0) | 120 |
| 1997 (1) | 30 |

| Year | Dummy | Metric1 |
|---|---|---|
| 1996 (0) | (0) | 50 |
| 1996 (0) | (1) | 70 |
| 1997 (1) | (0) | 30 |

SYSTEMS AND METHODS FOR ENHANCED SQL INDICES FOR DUPLICATE ROW ENTRIES

FIELD OF THE INVENTION

The present invention relates to the field of data processing and analytics and, more particularly, to systems and methods of indexing row entries in a data processing and analytics system.

BACKGROUND OF THE INVENTION

The ability to act quickly and decisively in today's increasingly competitive marketplace is critical to the success of any organization. The volume of data that is available to organizations is rapidly increasing and frequently overwhelming. The availability of large volumes of data presents various challenges. One challenge is to avoid inundating an individual with unnecessary information. Another challenge is to ensure all relevant information is available in a timely manner.

One known approach to addressing these and other challenges is known as data warehousing. Data warehouses, relational databases, and data marts are becoming important elements of many information delivery systems because they provide a central location where a reconciled version of data extracted from a wide variety of operational systems may be stored. As used herein, a data warehouse should be understood to be an informational database that stores shareable data from one or more operational databases of record, such as one or more transaction-based database systems. A data warehouse typically allows users to tap into a business's vast store of operational data to track and respond to business trends that facilitate forecasting and planning efforts. A data mart may be considered to be a type of data warehouse that focuses on a particular business segment.

Decision support systems have been developed to efficiently retrieve selected information from data warehouses. One type of decision support system is known as an on-line analytical processing system ("OLAP"). In general, OLAP systems analyze the data from a number of different perspectives and support complex analyses against large input data sets.

There are at least three different types of OLAP architectures—ROLAP, MOLAP, and HOLAP. ROLAP ("Relational On-Line Analytical Processing") systems are systems that use a dynamic server connected to a relational database system. Multidimensional OLAP ("MOLAP") utilizes a proprietary multidimensional database ("MDDB") to provide OLAP analyses. The main premise of this architecture is that data must be stored multidimensionally to be viewed multidimensionally. A HOLAP ("Hybrid On-Line Analytical Processing") system is a hybrid of these two.

Typically, business users rely on the above-noted OLAP systems to analyze large volumes of their business information in order to ascertain useful trends and productivity information. The OLAP systems are used to query databases containing the business information and to generate customizable reports which summarize this information.

While OLAP systems are a powerful tool for querying a business entity's business information databases, the reports generated by these systems are not the preferred method of conveying information to other members of a business organization, in particular business managers and others who rely on this information to make business decisions. One reason for this, as noted above, is that interfacing with OLAP systems often requires technical expertise that is only possessed by relatively few individuals in a business organization. It is often necessary to learn a new programming interface in order to operate the OLAP system. Also, because OLAP systems are proprietary and relatively expensive, installation of OLAP clients is not universal among business employee computer systems. Generally, only those who have a need to interface with the OLAP system will have the OLAP client installed on their desktop computer. Another limitation of OLAP systems is that they typically have only limited formatting options available. As a result, reports generated by OLAP systems are frequently exported and used in other applications, such as, for example, business productivity clients whose installation and use is often more universal. These business productivity clients include, but are not limited to the MICROSOFT OFFICE suite of business productivity clients including ACCESS database, EXCEL spreadsheet, MSWORD word processor and POWERPOINT presentation tool. These applications allow users to create sophisticated documents and visual presentations that transform raw business data into an aesthetically pleasing and meaningful format. As a result, their use in the business world has become nearly universal.

Generating customizable reports based on the various user-defined SQL queries of a business entities data is a key feature of OLAP systems. For a description of OLAP reports and reporting functionality, refer to commonly assigned U.S. Pat. No. 6,279,033 hereby incorporated by reference in its entirety.

Because OLAP system is used to move and analyze the data rather than to create it, formatting problems can arise between the analyzed engine of the OLAP system and the data records themselves. One specific problem with generating reports based on field indexed data arises when two or more identically indexed entries exist in a report. For example, if the information is sales total figures for a particular reporting period, there may be two or more data records with corresponding values that are indexed the same way, depending on the number of index fields associated with the value. The reporting period 2005, may have, for example, 4 reporting periods, i.e., quarters 1 through 4, however, if the quarter identifier index field is not selected in the query, the records become indistinguishable and are merely aggregated. It may however, be desirable to identify and visualize the different reporting periods without having to include the quarter identifier index field. Alternatively, the particular distinguishing identifier index field may be visually meaningless, such as for example, a numeric code, or it may even be unavailable depending upon the state of the data being accessed by the OLAP system.

In the database arts, one method of distinguishing between otherwise identically indexed entries is to use a key variable, that is, an incremented number that uniquely identifies each row in a database table. This solution is impractical to the OLAP systems because the data may be from a variety of different sources and in differing formats. OLAP systems analyze data from a number of different perspectives and support complex analyses against large input data sets using templates and analysis routines rather than writing data records to the various data sources. Also, using an incremented key value provides an unnecessarily cumbersome scheme for distinguishing records because the key value can become extremely large. Furthermore, it is not necessary to have a key value to distinguish non-identically indexed entries. Rather it is only necessary to distinguish identically indexed entries from one another. This greatly reduces the required number of identifying indices.

Therefore, there exists a need to be able to distinguish non-uniquely indexed entries from one another in a report generated by an OLAP system.

SUMMARY OF THE INVENTION

In view of the foregoing problem of separately identifying non-uniquely indexed entries in a report and of the shortcomings of conventional methods of preventing non-unique indices in databases, various embodiments may provide a method for indexing non-uniquely indexed entries in a business intelligence system report.

Various embodiments of the present invention may further provide a system for distinguishing entries in an online business intelligence system that are indexed by a non-unique tuple.

Various embodiments of the present invention may additionally provide computer instructions adapted to cause an analytical engine at a business intelligence system to distinguish non-uniquely indexed elements in a business intelligence system.

To achieve the objects and in accordance with the purpose of the invention, as embodied and broadly described herein, this invention, in one embodiment, provides a method for indexing non-unique indices in a business intelligence system. The method for indexing non-unique indices in a business intelligence system according to this embodiment comprises adding a dummy index to each of a plurality of non-unique index elements stored in an online business intelligence system.

In another embodiment according to this invention, a system for distinguishing duplicate index elements in an online business intelligence system is provided. The system for distinguishing duplicate index elements in an online business intelligence system according to this embodiment comprises an online business intelligence system, a report generator adapted to add a dummy index to each of a plurality of non-unique index elements stored in an online business intelligence system, wherein the dummy index is in a row axis of a base template of a report generator of the business intelligence system, and a GUI.

In an additional embodiment of this invention a computer readable storage medium storing computer instructions therein, the instructions adapted to cause an analytical engine of a business intelligence system to distinguish new uniquely indexed entries in a report generated therewith. The computer readable storage medium according to this embodiment comprises instructions for executing a return-based business intelligence system, instructions for executing a report generator subsystem of an analytical engine of the business intelligence system, instructions for adding a dummy index to each non-uniquely indexed element returned in a report query submitted in a report query submitted to the business intelligence system, wherein the dummy index is in a row axis of a base template of a report generator of the business intelligence system, and instructions for interfacing with a GUI.

These and other features and advantages of the preferred embodiments will become more readily apparent when the detailed description of the preferred embodiments is read in conjunction with the attached drawings. The accompanying drawings, which are incorporated in and constitute a part of this specification, illustrate the embodiments of the invention and, together with the description, serve to explain the principles of the invention.

BRIEF DESCRIPTION OF THE DRAWINGS

FIG. 2 is an OLAP-generated report resulting from a user generated report query including non-unique indices in accordance with at least one embodiment of the invention;

FIG. 3 is an OLAP-generated report resulting from a user generated report query including non-unique indices and a dummy index in accordance with at least one embodiment of the invention;

FIG. 4 is an OLAP-generated report resulting from a user generated report query including non-unique indices illustrating the results to the report of using a dummy index in accordance with at least one embodiment of the invention;

FIG. 5 is another OLAP-generated report resulting from a user generated report query including non-unique indices illustrating the results to the report of using a dummy index in accordance with at least one embodiment of the invention;

FIG. 6 is yet another OLAP-generated report resulting from a user generated report query including non-unique indices illustrating the results to the report of using a dummy index in accordance with at least one embodiment of the invention;

FIG. 7 is an OLAP-generated report resulting from a user generated report query including non-unique indices illustrating the results to a subtotaled report of using a dummy index in accordance with at least one embodiment of the invention;

FIG. 8 is another OLAP-generated report resulting from a user generated report query including non-unique indices illustrating the results to a subtotaled report of using a dummy index in accordance with at least one embodiment of the invention;

FIG. 9 is yet another OLAP-generated report resulting from a user generated report query including non-unique indices illustrating the results to a subtotaled report of using a dummy index in accordance with at least one embodiment of the invention;

FIG. 10 is an additional OLAP-generated report resulting from a user generated report query including non-unique indices illustrating the results to a subtotaled report of using a dummy index in accordance with at least one embodiment of the invention;

FIG. 11 is still a further OLAP-generated report resulting from a user generated report query including non-unique indices illustrating the results to a subtotaled report of using a dummy index in accordance with at least one embodiment of the invention;

FIG. 12 is an OLAP-generated report resulting from a user generated report query including attribute aggregation when a dummy index is included only on the base template in accordance with at least one embodiment of the invention; and FIG. 13 is an OLAP-generated report resulting from a user generated report query including attribute aggregation when a dummy index is included on the base template as well as on the view template in accordance with at least one embodiment of the invention.

DETAILED DESCRIPTION OF THE INVENTION

Figure 1:
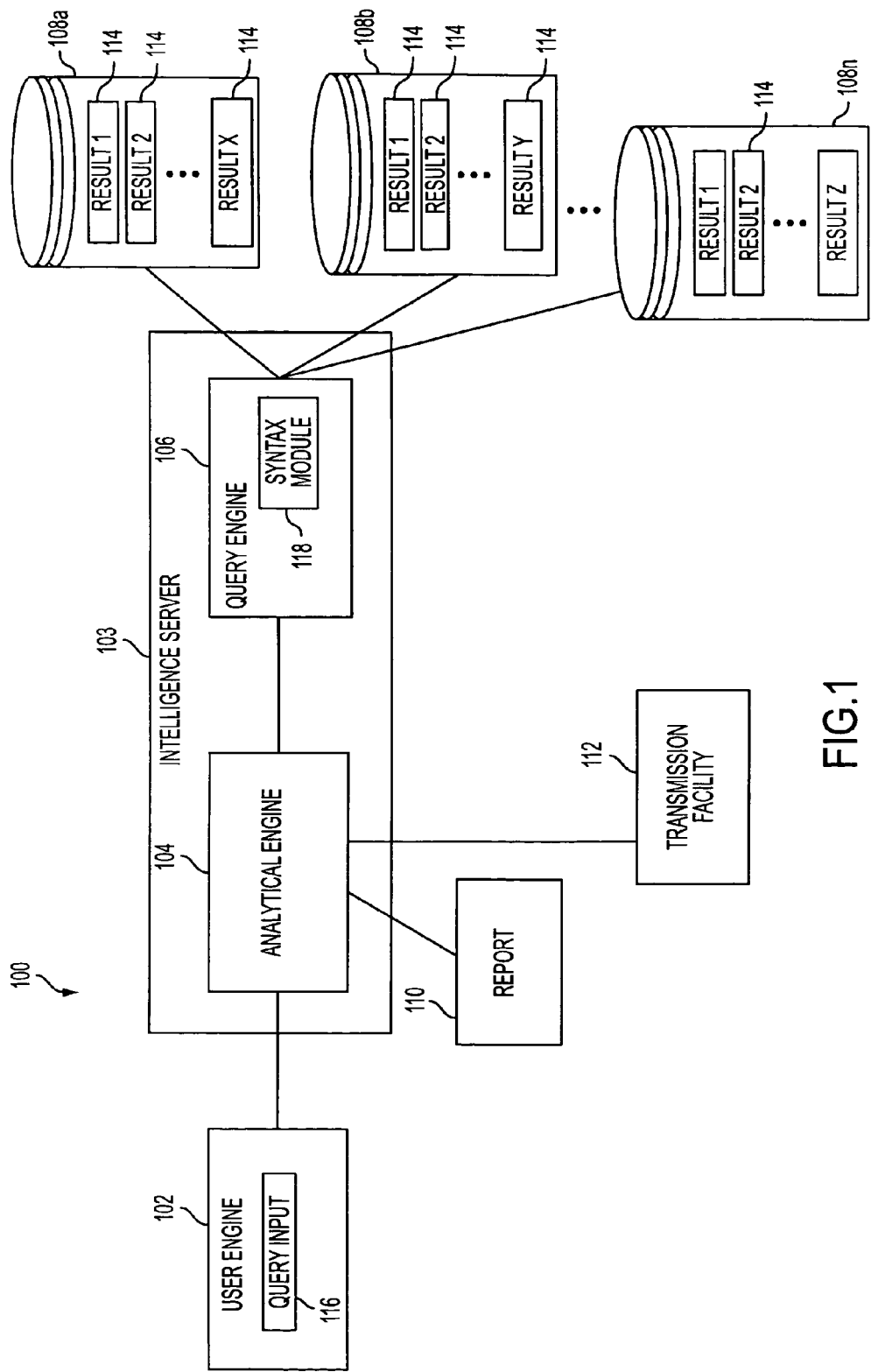
FIG. 1 is a block diagram illustrating an architecture for a business intelligence reporting system for use with one or more embodiments of the invention.

The following description is intended to convey a thorough understanding of the invention by providing specific embodiments and details involving business intelligence systems and systems and methods for interacting with a business intelligence system with a business productivity client using a multi-level interface client. It is understood, however, that the invention is not limited to these specific embodiments and details, which are exemplary only. It further is understood that one possessing ordinary skill in the art, in light of known systems and methods, would appreciate the use of the invention for its intended purposes and benefits in any number of alternative embodiments, depending upon specific design and other needs.

As used herein, the term "business intelligence system" may be understood to refer to any type of computer system that utilizes one or more on-line analytical processing systems including, but not limited to ROLAP, MOLAP, and HOLAP systems. For example, this term may refer to a business intelligence system such as the MICROSTRATEGY 7i business intelligence platform available from MicroStrategy Inc., of McLean, Va.

As used herein, the terms "productivity client," "business productivity client," "productivity suite" and "business productivity suite" may be understood to refer to any type of software application typically utilized to enhance productivity such as a word processing software client, a spreadsheet software client, a presentation software client and a database software client. In one embodiment, "productivity suite" will refer to the MICROSOFT OFFICE suite of productivity clients including the MSWORD word processor client, the EXCEL spreadsheet client, the POWERPOINT presentation client and the ACCESS database client.

Exemplary System Platform

Referring now to FIG. 1, FIG. 1 is a block diagram illustrating an architecture for a reporting system 100 by which a variety of data resources may be accessed for business analytic, report generation and other intelligence purposes for use with embodiments of the invention. According to one embodiment, the reporting system 100 may comprise a business intelligence, Online Analytical Processing (OLAP) decision support system (DSS) or other reporting system. In particular, FIG. 1 may comprise a portion of the MicroStrategy 7i platform which provides an exemplary system in which one or more embodiments of the present invention may be implemented.

In general, through using the reporting system 100, analysts, managers and other users may query or interrogate a plurality of databases or database arrays to extract demographic, sales, and/or financial data and information and other patterns from records stored in such databases or database arrays to identify strategic trends. Those strategic trends may not be discernable without processing the queries and treating the results of the data extraction according to the techniques performed by the systems and methods described herein. This is in part because the size and complexity of some data portfolios stored in such databases or database arrays may mask those trends.

In addition, the reporting system 100 may enable the creation of reports or the provision of services that are processed according to a predetermined schedule. The user may then subscribe to the services, provide personalization criteria and have the reports automatically delivered to the user, as described in U.S. Pat. No. 6,154,766 to Yost et al. (the "'766 patent"), which is commonly assigned and hereby incorporated by reference in its entirety.

As illustrated in FIG. 1, a business, a government or another user may access the resources of the reporting system 100 using a user engine 102. The user engine 102 may include a query input module 116 to accept a plurality of searches, queries or other requests, via a query box on a graphical user interface (GUI) or another similar interface. The user engine 102 may communicate with an analytical engine 104. The analytical engine 104 may include a set of extensible modules to run a plurality of statistical analyses, to apply filtering criteria, to perform a neural net technique or another technique to condition and treat data extracted from data resources hosted in the reporting system 100, according to a query received from the user engine 102.

The analytical engine 104 may communicate with a query engine 106, which in turn interfaces to one or more data storage devices 108a, 108b . . . 108n (where n is an arbitrary number). The data storage devices 108a, 108b . . . 108n may include or interface to a relational database or another structured database stored on a hard disk, an optical disk, a solid state device or another similar storage media. When implemented as databases, the data storage devices 108a, 108b . . . 108n may include or interface to, for example, an Oracle™ relational database such as sold commercially by Oracle Corporation, an Informix™ database, a Database 2 (DB2) database, a Sybase™ database, or another data storage device or query format, platform or resource such as an OLAP format, a Standard Query Language (SQL) format, a storage area network (SAN), or a Microsoft Access™ database. It should be understood that while data storage devices 108a, 108b . . . 108n are illustrated as a plurality of data storage devices, in some embodiments the data storage devices may be contained within a single database or another single resource.

Any of the user engine 102, the analytical engine 104 and the query engine 106 or other resources of the reporting system 100 may include or interface to or be supported by computing resources, such as one or more associated servers. When a server is employed for support, the server may include, for instance, a workstation running a MICROSOFT WINDOWS XP operating system, MICROSOFT WINDOWS NT operating system, a MICROSOFT WINDOWS 2000 operating system, a Unix operating system, a Linux operating system, a Xenix operating system, an IBM AIX operating system, a HEWLETT-PACKARD UX operating system, a NOVELL NETWARE operating system, a SUN MICROSYSTEMS SOLARIS operating system, an IBM OS/2 operating system, a BeOS operating system, a APPLE OSX operating system, an Apache platform, an OPENSTEP operating system, or another similar operating system or platform. According to one embodiment of the present invention, the analytical engine 104 and the query engine 106 may comprise elements of an intelligence server 103.

The data storage devices 108a, 108b . . . 108n may be supported by a server or another resource and may, in some embodiments, include redundancy, such as a redundant array of independent disks (RAID), for data protection. The storage capacity of any one or more of the data storage devices 108a, 108b . . . 108n may be of various sizes, from relatively small data sets to very large database (VLDB)-scale data sets, such as warehouses holding terabytes of data or more. The fields and types of data stored within the data storage devices 108a, 108b . . . 108n may also be diverse, and may include, for instance, financial, personal, news, marketing, technical, addressing, governmental, military, medical or other categories of data or information.

The query engine 106 may mediate one or more queries or information requests from those received from the user at the user engine 102 to parse, filter, format and otherwise process such queries to be submitted against the data contained in the data storage devices 108a, 108b . . . 108n. Thus, a user at the user engine 102 may submit a query requesting information in SQL format, or have the query translated to SQL format. The submitted query is then transmitted via the analytical engine 104 to the query engine 106. The query engine 106 may determine, for instance, whether the transmitted query may be processed by one or more resources of the data storage devices 108a, 108b . . . 108n in its original format. If so, the query engine 106 may directly transmit the query to one or more of the resources of the data storage devices 108a, 108b . . . 108n for processing.

If the transmitted query cannot be processed in its original format, the query engine 106 may perform a translation of the query from an original syntax to a syntax compatible with one or more of the data storage devices 108a, 108b . . . 108n by invoking a syntax module 118 to conform the syntax of the query to standard SQL, DB2, Informix™, Sybase™ formats or to other data structures, syntax or logic. The query engine 106 may likewise parse the transmitted query to determine whether it includes any invalid formatting or to trap other errors included in the transmitted query, such as a request for sales data for a future year or other similar types of errors. Upon detecting an invalid or an unsupported query, the query engine 106 may pass an error message back to the user engine 102 to await further user input.

When a valid query such as a search request is received and conformed to a proper format, the query engine 106 may pass the query to one or more of the data storage devices 108a, 108n . . . 108n for processing. In some embodiments, the query may be processed for one or more hits against one or more databases in the data storage devices 108a, 108b . . . 108n. For example, a manager of a restaurant chain, a retail vendor or another similar user may submit a query to view gross sales made by the restaurant chain or retail vendor in the State of New York for the year 1999. The data storage devices 108a, 108b . . . 108n may be searched for one or more fields corresponding to the query to generate a set of results 114.

Although illustrated in connection with each data storage device 108 in FIG. 1, the results 114 may be generated from querying any one or more of the databases of the data storage devices 108a, 108b . . . 108n, depending on which of the data resources produce hits from processing the search query. In some embodiments of the reporting system 100 of the invention, the results 114 may be maintained on one or more of the data storage devices 108a, 108b . . . 108n to permit one or more refinements, iterated queries, joinders or other operations to be performed on the data included in the results 114 before passing the information included in the results 114 back to the analytical engine 104 and other elements of the reporting system 100.

When any such refinements or other operations are concluded, the results 114 may be transmitted to the analytical engine 104 via the query engine 106. The analytical engine 104 may then perform statistical, logical or other operations on the results 114 for presentation to the user. For instance, the user may submit a query asking which of its retail stores in the State of New York reached $1M in sales at the earliest time in the year 1999. Or, the user may submit a query asking for an average, a mean and a standard deviation of an account balance on a portfolio of credit or other accounts.

The analytical engine 104 may process such queries to generate a quantitative report 110, which may include a table or other output indicating the results 114 extracted from the data storage devices 108a, 108b . . . 108n. The report 110 may be presented to the user via the user engine 102, and, in some embodiments, may be temporarily or permanently stored on the user engine 102, a client machine or elsewhere, or printed or otherwise output. In some embodiments of the reporting system 100 of the invention, the report 110 or other output may be transmitted to a transmission facility 112, for transmission to a set of personnel via an email, an instant message, a text-to-voice message, a video or via another channel or medium. The transmission facility 112 may include or interface to, for example, a personalized broadcast platform or service such as the NARROWCASTER platform or TELECASTER service sold by MicroStrategy Incorporated or another similar communications channel or medium. Similarly, in some embodiments of the invention, more than one user engine 102 or other client resource may permit multiple users to view the report 110, such as, for instance, via a corporate intranet or over the Internet using a Web browser. Various authorization and access protocols may be employed for security purposes to vary the access permitted users to such report 110 in such embodiments.

Additionally, as described in the '766 patent, an administrative level user may create a report as part of a service. Subscribers/users of the service may then receive access to reports through various types of data delivery devices including telephones, pagers, computers, PDAs, WAP protocol devices, email, facsimile, and many others. In addition, a subscriber/user may specify trigger conditions so that the subscriber/user receives a report only when a trigger condition has been satisfied, as described in detail in the '766 patent. The reporting system 100 of FIG. 1 may have many other uses, as described in detail with respect to the MICROSTRATEGY 7x platforms, the details of which will be appreciated by one of ordinary skill in the reporting and decision support system art.

Exemplary Embodiments of the Invention

Referring now to FIG. 2, FIG. 2 is an OLAP generated report resulting from a report query including non-unique indices in accordance with at least one embodiment of the invention. It should be appreciated that the reports illustrated in the various Figures illustrating the embodiment of this invention are oversimplified for ease of illustration purposes only. That is, for example, in the view shown in FIG. 2 there are only 5 entries in the report for the attribute tuple (Country, Year). In practical application, the report may return a much larger data set comprised of N-degree tuples where N is an integer of 2 or larger. The principles of the invention apply equally regardless of the size of the data set returned in the report or the number of attributes.

In an OLAP system, report configuration is done by setting up a base template, that is a template including all index elements to be queried and a view template which effects what index elements and corresponding entries appear in the report. Also, choice of axis may be made for each index element.

With continued reference to FIG. 2, there are non-unique indices from the Country and Year attribute elements in the report 200. For example, the tuple (USA, 1996) has row entry values of 10 and 20, and the tuple (Web, 1996) has a row entry values of 40 and 50. This can cause problems for the analytical engine of the intelligence server of the OLAP system and also render the report confusing. Therefore, it is necessary to modify the procedure executed by the analytical engine to distinguish the non-unique tuples to preserve the uniqueness of each entry in a manner that intrusion and complexity reduces. In various embodiments of this invention, this is accomplished by modifying the procedure executed by the analytical engine to add an extra "dummy" index to each entry in the report to separately identify entries that are non-uniquely indexed.

Referring now to FIG. 3, an OLAP generated report resulting from a report query including non-unique indices and a dummy index in accordance with at least one embodiment of the invention is illustrated. In various embodiments of the invention, a dummy index is added to the row axis (as opposed to the column axis)—that is, each non-uniquely indexed entry will appear as a separate row having a different dummy index than its duplicate counterpart. Referring to the table 300A of FIG. 3, the dummy index value for the tuple (USA, 1996) has a value of "0" for the first instance and a value of "1" for the second instance. Likewise, the tuple (Web, 1996) has a value of "0" for the first instance and a value of "1" for the second instance. In fact all unique entries have a dummy index value of "0". Only entries which repeat the same attributes are given dummy index values of "1", "2", "n", etc. as necessary to account for the duplicate entries—where n is an integer greater than 2.

Referring now to FIGS. 4-6 the results of using a dummy index with various report formats are illustrated in accordance with embodiments of the invention. FIG. 4 is an OLAP generated report resulting from a report query including non-unique indices illustrating the results to the report of using a dummy index in accordance with at least one embodiment of the invention. Notice that with attribute Country on the row axis and attribute Year on the column axis, based on the same data in table 300A of FIG. 3, the report 300B is returned with four row entries. The fact that the tuples (USA, 1996) and (Web, 1996) are non-unique is reflected by the values of "0" and "1" for the dummy index. Where the attribute tuple has no value null appears. Thus, the row entries for the country attribute are organized by dummy index value reflecting that there are two entries for the tuples (USA, 1996) and (Web, 1996) but only one entry for the tuple (USA, 1997).

Referring now to FIG. 5, another OLAP generated report resulting from a report query including non-unique indices that illustrates the results to the report of using a dummy index in accordance with at least one embodiment of the invention is illustrated. The report 300C shown in FIG. 5 pivots the attribute Country onto the column axis and puts the attribute Year on the row axis, essentially reversing the structure of the report 300B of FIG. 4. Note that the dummy index still appears on the row axis. This report 300C reflects that the year 1996 had non-uniquely indexed entries for both the USA and Web Country attributes while 1997 had no non-uniquely indexed entries.

Referring now to FIG. 6, yet another OLAP generated report resulting from a report query including non-unique indices that illustrates the results to the report of using a dummy index in accordance with at least one embodiment of the invention is illustrated. FIG. 6 shows a report 300D in which both Country and Year attributes have been placed on column axis with only the dummy index remaining on the row axis. It is still apparent from this table 300D that only 1996 contains non-uniquely indexed entries for both the USA and Web country attributes.

Referring now to FIGS. 7-11, the results of using a dummy index with various subtotaled report formats are illustrated in accordance with embodiments of the invention. Subtotaling is a feature of the OLAP reporting system that automatically subtotals and totals entry values over each row and column index. FIG. 7 is an OLAP generated report resulting from a report query including non-unique indices in which the results to a subtotaled report of using a dummy index in accordance with at least one embodiment of the invention are illustrates. The report 400A of FIG. 7 is similar to the report 300B shown in FIG. 4 to the extent that the Country attribute is on the row axis and the Year attribute is on the column axis. Using this report configuration, a total value is obtained with both row and column-wise subtotals for each attribute.

FIG. 8 is another OLAP generated report resulting from a report query including non-unique indices illustrating the results to a subtotaled report of using a dummy index in accordance with at least one embodiment of the invention. The report 400B shown in FIG. 8 is based on the report configuration of FIG. 5 in that the Year and Country attributes have switched to the row and column axes respectively. In the report 400B of FIG. 8, sub totals for each Country and Year attribute are displayed.

FIG. 9 is yet another OLAP generated report resulting from a report query including non-unique indices illustrating the results to a subtotaled report of using a dummy index in accordance with at least one embodiment of the invention. FIG. 9 is based on the report configuration of FIG. 6 in that both attributes have been moved to the column axis. In the report 400C shown in this Figure, totals are obtained for each (Year, Country) tuple—across each dummy index.

FIG. 10 is an additional OLAP generated report resulting from a report query including non-unique indices illustrating the results to a subtotaled report of using a dummy index in accordance with at least one embodiment of the invention. The report 400D of FIG. 10 shows the country and year attributes on the row axis. Thus subtotals are done with respect to the country attribute across all dummy indices. In various embodiments, subtotals will always be done across all dummy indices. The report 400E shown in FIG. 11 is similar to that of FIG. 10 except that the ordering of the country and year attributes have been switched on the row axis. Thus, in the report 400E of FIG. 11, subtotals are provided for each year, across the country and dummy attributes.

Referring now to FIGS. 12 and 13, FIG. 12 is an OLAP generated report resulting from a report query including attribute aggregation when a dummy index is included only on the base template in accordance with at least one embodiment of the invention. Aggregation is an OLAP report feature that automatically sums all entries for a selected attribute. For example, in the report 500A of FIG. 12, values for Metric 1 have been aggregated for the Year attribute. It can be seen that there is only data for two years. In this report 500A it is important to note that the dummy index has been restricted to the base template only. Thus, separate row entries are not provided for non-uniquely indexed rows in the report. FIG. 13, however, shows a report 500B generated from the same data, but with the notable difference that the dummy variable has also been added to the view template. Thus, the totals have been broken out by year and by dummy index providing 3 row entries to reflect the fact that year 1996 contained non-uniquely indexed entries but 1997 did not.

It will be apparent to those skilled in the art that various modifications and variations can be made in the apparatuses and methods of the present invention without departing from the scope or spirit of the invention. Thus, it is intended that the present invention cover the modifications and variations of this invention provided they come within the scope of the appended claims and their equivalents.

The invention claimed is:

1. A method for indexing non-uniquely indexed entries in a report generated by an online business intelligence system comprising:

identifying non-uniquely indexed entries and uniquely indexed entries returned by a report generator of the online business intelligence system, wherein the non-uniquely indexed entries comprise a plurality of same entries and the uniquely indexed entries comprise of a plurality of different entries; and adding a dummy index to each of the identified non-uniquely indexed entries and each of the identified uniquely indexed entries, wherein adding a dummy index to each of the identified non-uniquely indexed entries comprises adding a different dummy variable to each of the identified non-uniquely indexed entries.

2. The method according to claim 1, wherein adding a dummy index comprises adding the dummy index to a base template of the report generator of the business intelligence system so as to appear on a row axis of the report.

3. The method of claim 1, wherein adding a different dummy variable to each of the identified non-uniquely indexed entries comprises changing a dummy variable between duplicate non-uniquely indexed entries, wherein each non-uniquely indexed entry has at least one corresponding value.

4. The method according to claim 1, wherein the dummy index is selectable by a user through a GUI for inclusion on a view template of the report generator of the business intelligence system.

5. The method of claim 4, further comprising upon the user executing a command to build the report through the GUI, generating a table having distinct row entries for each non-uniquely indexed entry.

6. The method of claim 1, wherein the report generator generates the report based on a query syntax selected from a group comprising multidimensional expressions and structured query language.

7. The method of claim 1, wherein the business intelligence system is an on-line analytical processing (OLAP) system.

8. A system for distinguishing duplicate index elements in a report generated by a business intelligence system comprising:
- an online business intelligence system;
- a report generator subsystem adapted to add a dummy index to each of a plurality of non-unique index elements and each of a plurality of unique index elements returned by the report generator subsystem, wherein the dummy index is added to a base template of the report generator subsystem so as to appear on a row axis of the report and the dummy index added to each of the plurality of non-unique index elements having a different dummy variable for each of the plurality of non-unique index elements.

9. The system according to claim 8, wherein the dummy index is selectable for inclusion on a view template of the report generator subsystem of the business intelligence system.

10. The system according to claim 8, wherein the different dummy variable added to each of the plurality of non-unique index elements changes between the duplicate non-unique index elements, wherein each of the plurality of non-unique index elements has at least one corresponding value.

11. The system according to claim 8, further comprising a GUI that is operable to allow a user to generate a table having distinct row entries for each of the duplicate index element.

12. The system of claim 8, wherein the report generator subsystem generates the report based on a query syntax selected from a group comprising multidimensional expressions and structured query language.

13. The system of claim 8, wherein the on-line business intelligence system is an on-line analytical processing (OLAP) system.

14. A non-transitory computer readable storage medium storing computer instructions therein, the instructions adapted to cause an analytical engine of a business intelligence system to index distinguish non-uniquely indexed entries in a report generated therewith, comprising:
- instructions for executing a network-based business intelligence software system;
- instructions for executing a report generator subsystem of the analytical engine of the business intelligence system to produce at least one report;
- instructions for adding a dummy index to each of a plurality of non-unique indexed elements and each of a plurality of unique indexed elements returned in a report query submitted to the business intelligence system, wherein the dummy index is in a row axis of a base template of the report generator subsystem so as to appear in a row axis of the report and the dummy index added to each of the plurality of non-unique indexed elements having a different dummy variable for each of the plurality of non-unique indexed elements; and
- instructions for interfacing with a GUI.

15. The non-transitory computer readable storage medium according to claim 14, further comprising instructions for enabling the dummy index to be selectable for inclusion on a view template of the report generator subsystem.

16. The non-transitory computer readable storage medium according to claim 14, wherein instructions for adding different dummy variable to each of the plurality of non-unique indexed elements such that the dummy variable changes between duplicate non-unique indexed elements, wherein each non-unique indexed element has at least one corresponding value.

17. The non-transitory computer readable storage medium according to claim 14, wherein the instructions for interfacing with a GUI are adapted to allow a user to generate the report having distinct row entries for each duplicate index element.

18. The non-transitory computer readable storage medium according to claim 14, wherein the instructions for executing a report generator software subsystem comprise instructions for generating the reports based on a query syntax selected from a group comprising multidimensional expressions and structured query language.

19. The non-transitory computer readable storage medium according to claim 14, wherein the instructions for executing a network-based business intelligence software system comprise instructions for executing an on-line analytical processing (OLAP) system.

* * * * *